United States Patent [19]

Miwa

[11] Patent Number: 4,921,468
[45] Date of Patent: May 1, 1990

[54] SPACE TRANSMISSION OPTICAL COMMUNICATION SYSTEM

[75] Inventor: Naomasa Miwa, Tokyo, Japan

[73] Assignee: Aisin Seiki Kabushiki Kaisha, Aichi, Japan

[21] Appl. No.: 171,093

[22] Filed: Mar. 21, 1988

[30] Foreign Application Priority Data

Mar. 20, 1987 [JP] Japan .................................. 62-064090
Mar. 20, 1987 [JP] Japan .................................. 62-064092

[51] Int. Cl.$^5$ .............................................. H04B 9/00
[52] U.S. Cl. .................................. 455/617; 350/276 R; 455/603; 340/905
[58] Field of Search ............... 455/619, 608, 615, 603, 455/605, 617; 350/276 SL, 276 R, 449, 450, 448; 250/347; 340/905

[56] References Cited

U.S. PATENT DOCUMENTS

| | | | |
|---|---|---|---|
| 3,431,504 | 3/1969 | Adler | 455/615 |
| 3,857,630 | 12/1974 | Gonzalez | 350/276 R |
| 3,876,308 | 4/1975 | Alpers | 455/608 |
| 4,307,294 | 12/1981 | Campbell | 455/619 |

Primary Examiner—Robert L. Griffin
Assistant Examiner—L. Van Beek
Attorney, Agent, or Firm—Sughrue, Mion, Zinn, Macpeak & Seas

[57] ABSTRACT

An optical communication system suited for transmitting optical signals to a moving station located on a vehicle comprises a transmitting station to send out coded optical pulse signals through space and a receiving station to receive the pulse signals. The transmitting station comprises a data input device, a signal encoder to convert the data into coded signals, an optical pulse signal generator to deliver the coded optical pulse signals, and a transmitting path setter to set a space path for transmitting the optical pulse signals. The receiving station comprises a receiving device for receiving the optical pulse signals transmitted from the transmitting station, a signal decoder to decode the optical pulse signals into coded signals, and a data display to represent the data in visible form based on the coded signals. The transmitting device may provided with an external light shade for preventing the receiving surface of the receiving device from external lights.

4 Claims, 17 Drawing Sheets

FIG.21(A)  EARTHQUAKE OF MAGNITUDE 5.0 OCCURRED. IMPASSABLE BECAUSE OF LANDSLIP.

FIG.21(B)  IMPASSABLE WITHOUT TIRE CHAINS BECAUSE OF HEAVY SNOWFALL.

FIG.21(C)  FREE PARKING LOT IS AVAILABLE AT HOTEL CR.

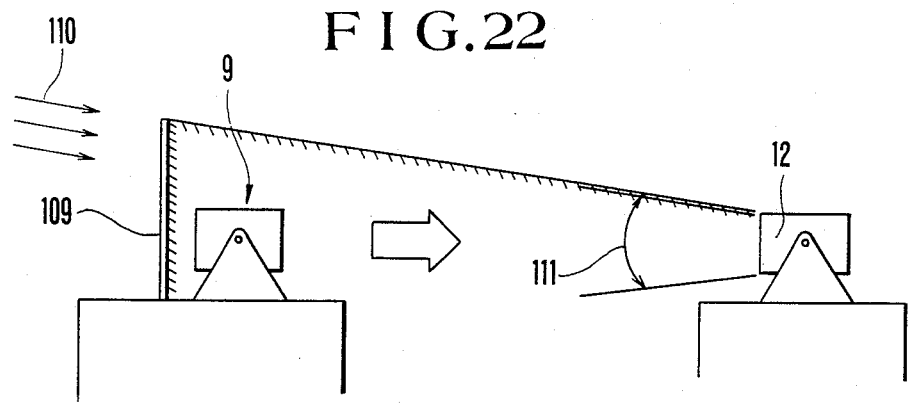
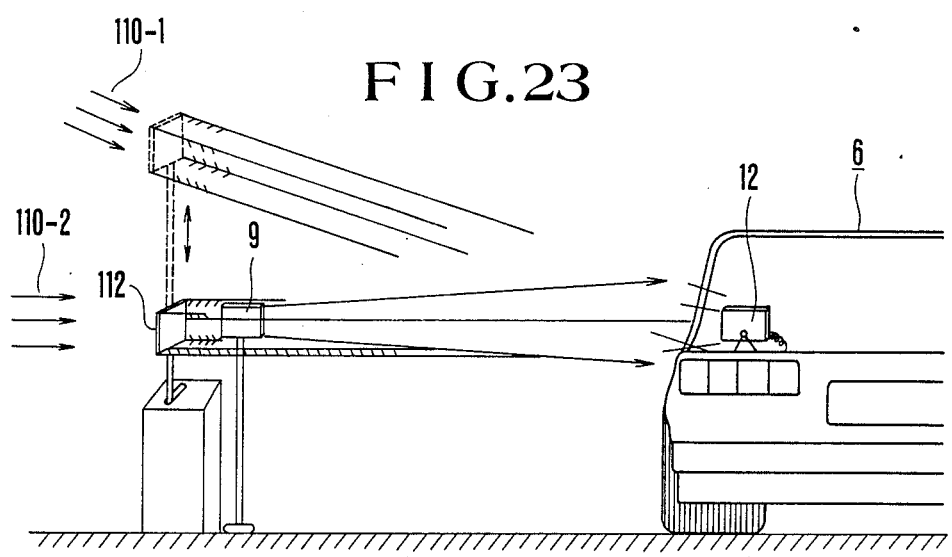

SPACE TRANSMISSION OPTICAL COMMUNICATION SYSTEM

BACKGROUND OF THE INVENTION

1. Field of the Invention

This invention relates to a space transmission optical communication system, particularly to an optical communication system which is suited for transmitting optical signals to a moving station located on a vehicle.

2. Description of the Prior Art

In conventional optical communication systems which are most widely used, a transmitting station and a receiving station are connected by an optical-fiber cable through which optical signals converted from data signals are sent from the transmitting station to the receiving station at which the data signals are reproduced from the received optical signals. Optical transmission systems of this type are advantageous in that the data transmitted through optical-fibers are free from electromagnetic induction that could be caused by high-tension cables, thunder-lightning and so on, and that they suffer little from transmission loss.

Meanwhile, space transmission optical communication systems that deliver optical signals through space without using optical-fiber cables have been also proposed. With such space transmission optical communication systems, a transmitting station modulates high-frequency carrier waves, using data signals, into modulated waves and sends out the obtained modulated light, while a receiving station receives the transmitted modulated light and photoelectrically convert and demodulate it into data signals.

Some optical communications systems require that the receiving station should be mobile, such as the one located on a vehicle. It is of course that the aforementioned cable transmission is not applicable to the mobile station. Further, to transmit adequate data to a vehicle that passes through the effective transmittable region of the delivered signals at high speed, it is necessary to increase the transmission rate of data. But, because the circuit used in the conventional space transmission optical communication systems responds to the high-frequency carrier waves, the transmission rate of data cannot be increased to the limit of the response speed of the circuit. To further increase the transmission rate of data, a circuit that could respond to signals of still higher frequencies should be designed. Such circuits will be intricate and costly. Also, in the space transmission optical communication system, attenuation and disappearance of optical signals in transmission space due to their directionality and external disturbing factors present serious problems. A fog in the transmission can greatly weaken the intensity of optical signals. When sunlight directly hits the receiving unit of the receiving station, optical signals can disappear under the influence of its energy. The directionality of optical signals can be a serious problem, too; especially so with the mobile station located on a vehicle. Optical signals of high intensity with high-precision directionality should be sent out to the vehicle running at high speed.

BRIEF SUMMARY OF THE INVENTION

The object of this invention is to provide a space transmission optical communication system that permits increasing the data transmission rate, improving the directionality of optical signals in transmission space, and preventing the attenuation and disappearance of optical signals in transmission space.

To achieve the aforementioned object, a space transmission optical communication system of this invention has a transmitting station that sends out optical pulse signals coded according to the on-off change in light intensity and means to set space transmitting and receiving paths to deliver such optical pulse signals.

More specifically, a space transmission optical communication system of this invention comprises a transmitting station to send out coded optical pulse signals and a receiving station to receive coded optical pulse signals sent through space from the transmitting station; the transmitting station comprising an input device to feed in data to be transmitted, a signal encoder to convert the data fed into the input device into corresponding coded signals, an optical pulse signal generator to deliver coded optical pulse signals corresponding to the coded signals encoded by the signal encoder, and a space transmitting path setter to set a path along which the coded optical pulse signals from the optical pulse signal generator are transmitted through space; and the receiving station comprising a space receiving path setter to set a path along which the coded optical pulse signals transmitted along the space transmitting path are received, a receiving device to receive the coded optical pulse signals, a signal decoder to decode the output from the receiving device into the coded signals, and a data display to represent the data in visible form based on the output from the signal decoder. The above-mentioned space transmission path setting device may have a means for shading external lights from the light receiving surface of the receiving station.

In the optical transmission system of this invention, the transmitting station sends out into space optical pulse signals coded according to the on-off changes in light intensity. Not using, unlike the conventional systems, high-frequency carrier waves for transmission, the system of this invention permits increasing the data transmission rate to the maximum response speed of its circuit.

The means for setting space transmitting and receiving paths make it possible to transmit coded optical pulse signals through transmission space in good condition without getting influenced by sunlight and other external disturbing factors.

Because of the ability to transmit high-quality data at high transmission rate, the optical transmission system of this invention is best-suited for transmitting emergency information, traffic information and other service information to a mobile receiving station located on a moving vehicle.

Data to be transmitted are entered in an input device at a transmitting station as electrical signals, which are converted into coded electrical signals represented by logics "1" and "0" by a signal encoder.

An optical pulse signal generator then converts the coded electrical signals into coded optical pulse signals which are delivered to a receiving station through transmission space. With the system of this invention, the space transmitting and receiving paths setting means provide high-precision directionality to the coded optical pulse signals sent from the transmitting station to the receiving station. This results in the receiving station receiving high-quality coded optical pulse signals. A receiving device at the receiving station converts the received coded optical pulse signals into electrical signals, from which the original coded signals are reproduced. A data display then represents the transmitted data in visible form based on the reproduced coded signals.

The optical transmission system of this invention can increase the transmission rate of information by sending through space data signals directly as signed optical pulse signals, without employing high-frequency carrier waves and paths of high-frequency response. The space transmitting and receiving paths setting means permit stable transmission without getting disturbed by external light. Thus, the space optical transmission system of this invention assures transmitting a large amount of high-quality data at high transmission speed.

The foregoing and other objects, features and advantages of the present invention will be understood more clearly and fully from the following detailed description of preferred embodiments with reference to the attached drawings.

BRIEF DESCRIPTION OF THE DRAWINGS

FIG. 21 (A), (B), and (C) are front views of the data display showing different types of information.

FIG. 22 and FIG. 23 show respectively a side view of the embodiment of an external light shading means provided to the space transmitting path setting means of the invention.

DETAILED DESCRIPTION OF THE PREFERRED EMBODIMENTS

Preferred embodiments of this invention will be described in detail in the following with reference to the accompanying drawings.

Figure 1:
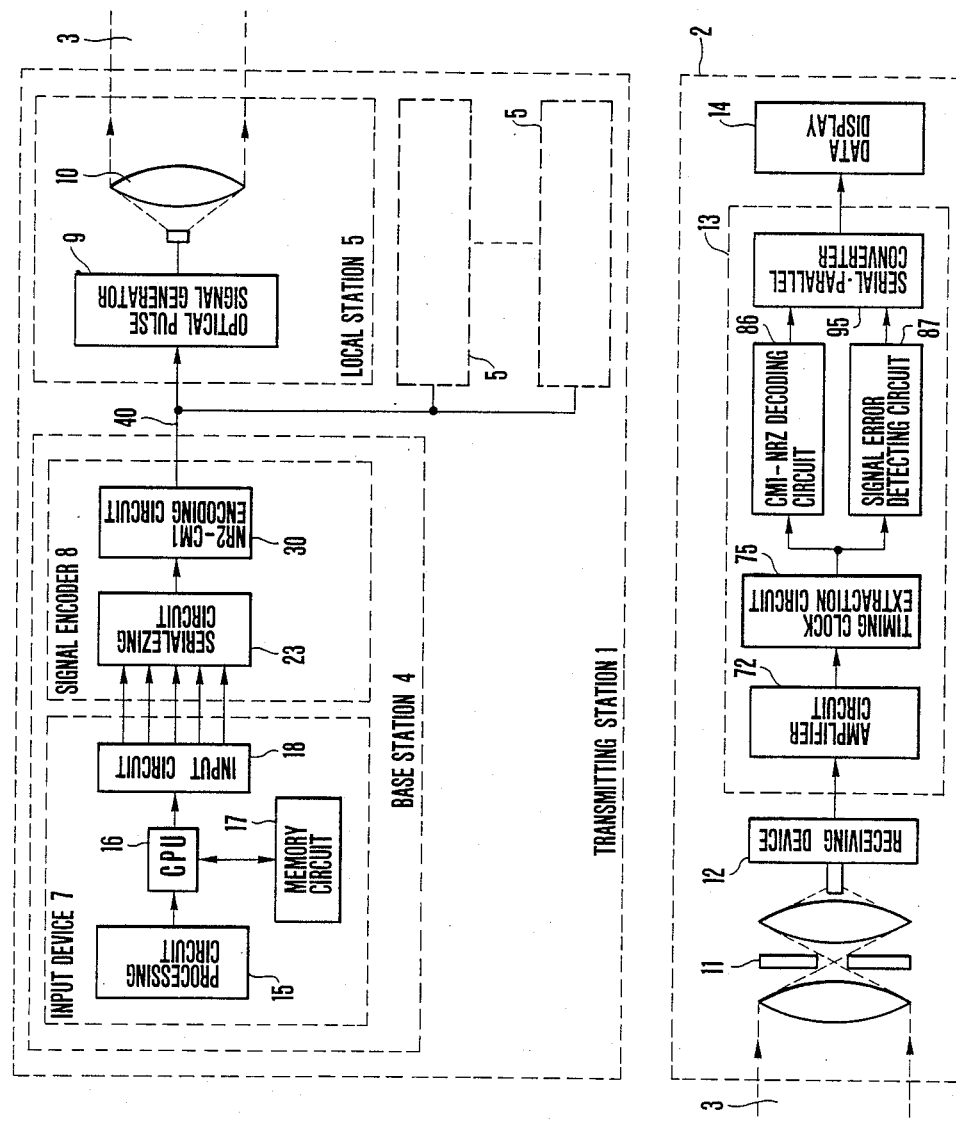
FIG. 1 is a block diagram showing the structure of a preferred of this invention.
Figure 2:
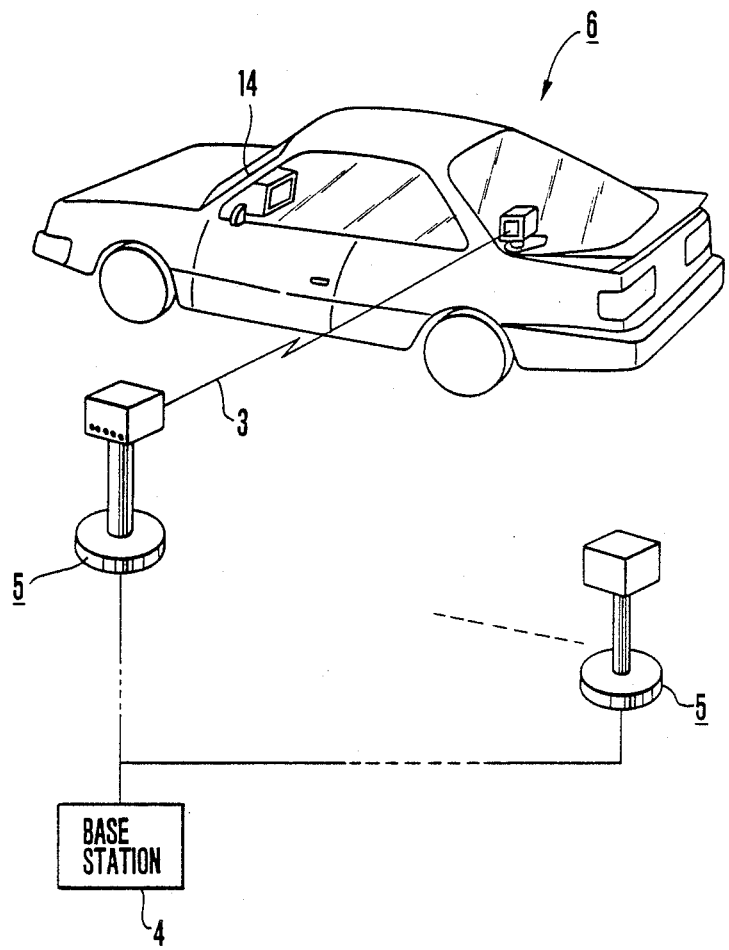
FIG. 2 a perspective view showing the arrangement of a local station and a receiving station of the preferred of this invention.

FIG. 1 is a block diagram showing the structure of a preferred embodiment of this invention which comprises a transmitting station 1 and a receiving station 2. Optical pulse signals 3 sent out from the transmitting station 1 are received by the receiving station 2.

In this preferred embodiment, the transmitting station 1 is fixed and the receiving station 2 is mobile. The transmitting station 1 consists of one base station 4 that is provided to cover a given travel range of a vehicle (such as on an expressway) and a plurality of local stations 5 connected to the base station 4. In this embodiment, the local stations 5 are provided at given intervals along an expressway over which a vehicle 6 travels.

The mobile receiving station 2 mounted on the vehicle 6 receives optical pulse signals representing various data delivered through space from each local station 5 as the vehicle 6 passes thereby.

The data the receiving station 2 thus obtains from each local station 5 can be classified into three categories; emergency information about the occurrence of disastrous earthquake, tsunami that would attack coastal roads, the closure of road due to disaster and so on, traffic information about the occurrence of accident on the road, use of tire chains in snowy areas, warnings on running speed and so on, and service information about accommodations and parking lots. A mobile station running at a speed of 100 km/hr., for example, can receive from each lock station 5 information of 1800 bits that are equivalent to about 200 characters.

The base station 4 has an input device 7 and a signal encoder 8. The local station has an optical pulse signal generator to convert the coded electrical signals prepared by the signal encoder 8 to represent the input data by logics "1" and "0", and a space transmitting path setting means 10 to set a path along which the coded optical pulse signals are to be sent through transmission space.

The receiving station has a space receiving path setting means 11 to set a path along which the coded optical pulse signals sent through transmission space are received, a receiving device 12 to receive the coded optical pulse signals, a signal decoder 13 to reproduce the coded signals from the output of the receiving device 12, and a data display 14 to show the data based on the reproduced signals.

Now more detailed description will be given to each of the component units.

Input Device

The input device 7 has a data processing circuit 15 in which various data can be fed in as electrical signals by, for example, key inputting means. Then, a central processing unit (CPU) 16 writes the data fed into the data processing circuit 15 into a memory circuit 17 are repeatedly read out as a read-out request signal is fed in the data processing circuit 15. The data thus read out are fed into an input circuit 18 as information signals.

Those of said emergency and traffic information which should be transmitted urgently can be read out and fed into the input circuit by interrupt operation prior to other data.

Figure 3:
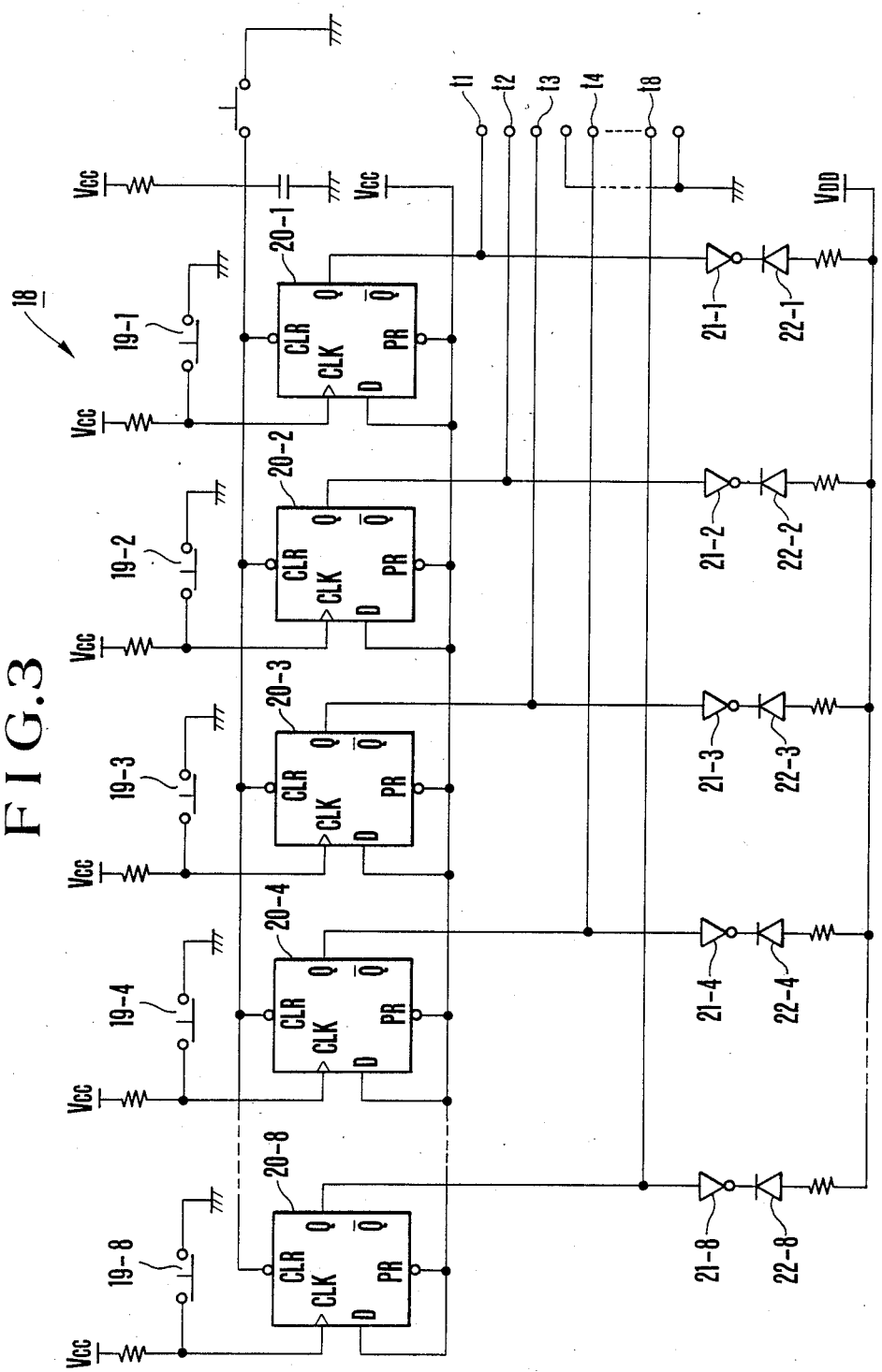
FIG. 3 is a circuit diagram showing the structure of an input of the preferred embodiment.

The input circuit 18 of the preferred embodiment is designed, as shown in FIG. 3, so that input is done from input switches 19-1 to 19-8 representing individual bits to corresponding flip-flops 20-1 to 20-8. The output terminals Q of the individual flip-flops lead to the output terminals t1 to t8 of the input circuit.

The negative side of light-emitting diodes 22-1 to 22-8 is connected through inversion buffers 21-1 to 21-8 to the output terminals Q of the flip-flops 20-1 to 20-8. The positive side of the light-emitting diodes 22-1 to 22-8 is connected to a plus power supply through resistors.

The CPU 16 feeds in the information data read out from the memory circuit 17 into the input switches 19-1 to 19-8, which are then fed into a serializing circuit 23 of the signal encoder 8.

Signal Encoder

Figure 4:
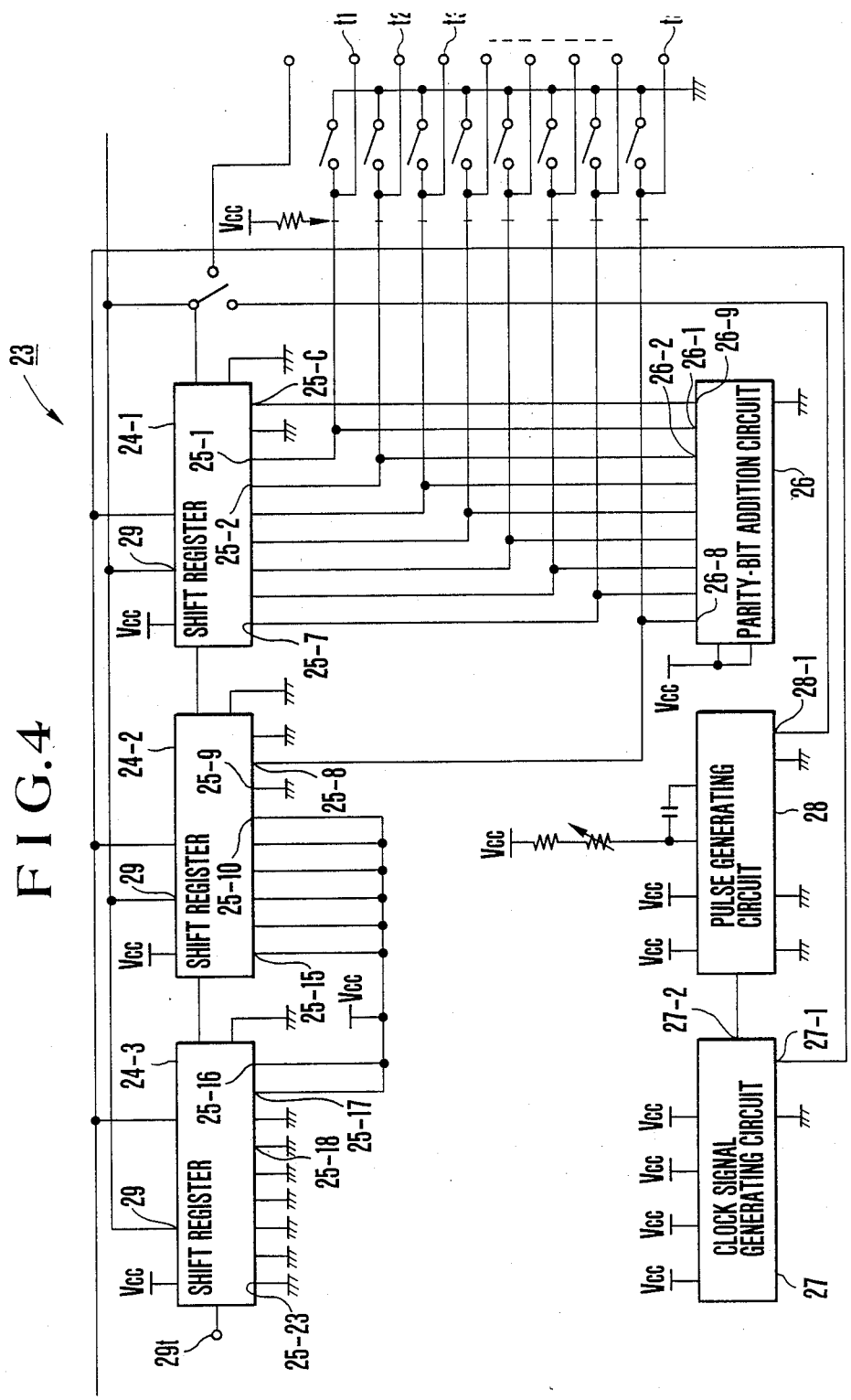
FIG. 4 is a circuit diagram showing the structure of a serializing circuit of the preferred embodiment.

The serializing circuit 23 has input terminals 25-1 to 25-8 which are connected to the output terminals t1 to t8 so that the information data from the input circuit are fed in parallel into the input terminals 25-1 to 25-8 of each stage of shift registers 24-1 and 24-2 that are connected to each other in series, as shown in FIG. 4.

The output terminals t1 to t8 are also connected to input terminals 26-1 to 26-8 of a parity-bit addition circuit 26, with an output terminal 26-9 of the parity-bit addition circuit 26 connected to an input terminal 25-0 of the shift register 24-1.

An input terminal 25-9 of the shift register 24-2 and input terminals 25-18 to 25-23 of the shift register 24-3, which is connected to the shift register 24-2 in series, are grounded, while the signals for input terminals 25-10 to 25-17 are set at logic "1" in accordance with the mark bit.

A clock signal generating circuit 27 feeds clock signals of 1 MHz to the shift registers 24-1 to 24-3. A pulse generating circuit 28 is connected to a frequency-dividing terminal 27-2 of the clock signal generating circuit 27. An output terminal 28-1 of the pulse generating circuit 28 is connected to the data-setting terminals 29 of the shift registers 24-1 to 24-3.

Figure 5:
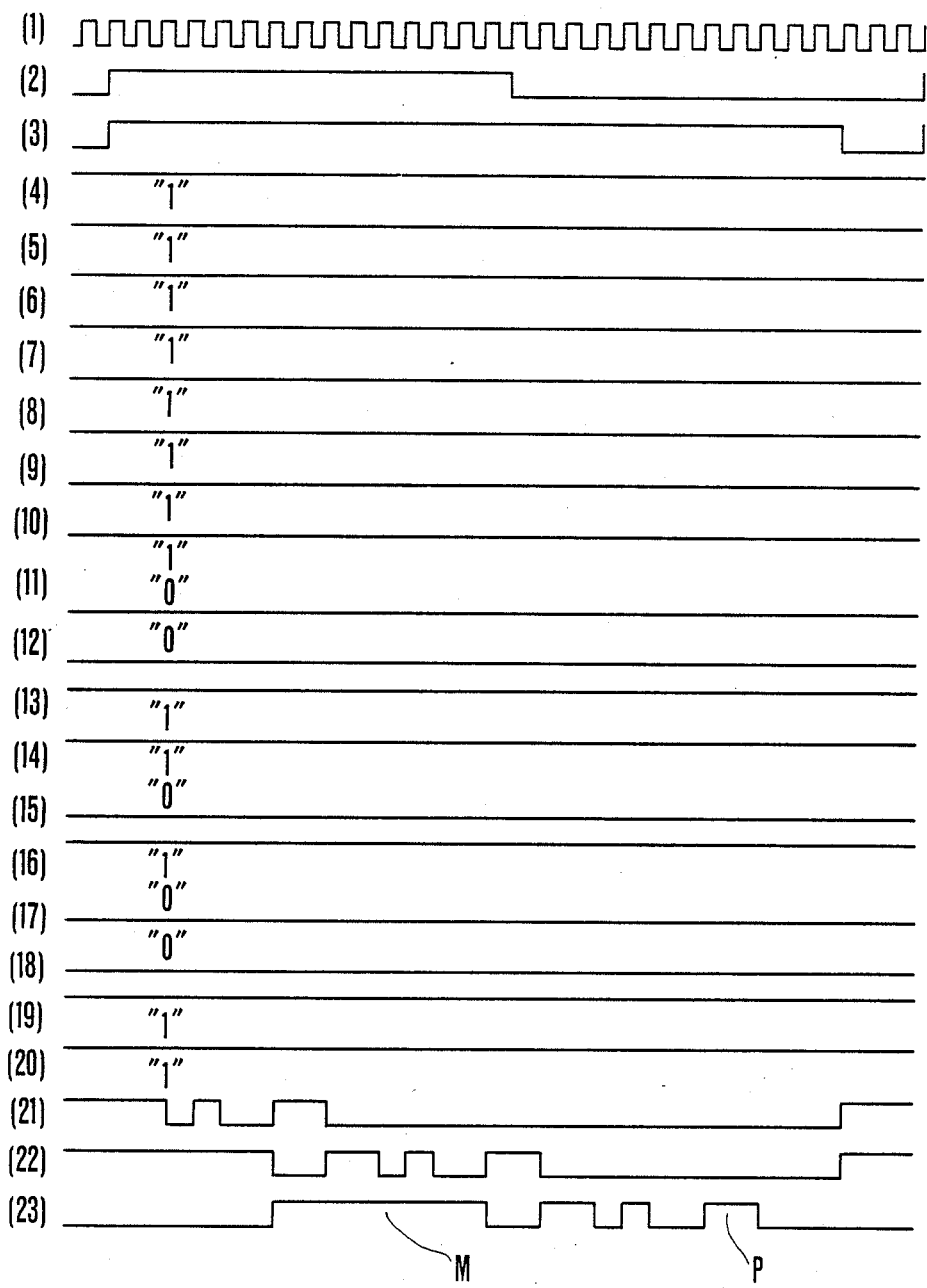
FIG. 5 shows signal waveforms at different parts of FIG. 4.

As shown at (2) of FIG. 5, the frequency-dividing terminal 27-2 of the clock signal generating circuit 27 feeds into the pulse generating circuit 28 pulse divided into 1/30 of the 1 MHz clock signals shown at (1). The output terminal 28-1 of the pulse generating circuit 28 sends out "H" pulses of approximately 27 microseconds from the rise of the pulses diveded into 1/30 of the 1 MHz clock signals. Data signals are fed into the shift registers 24-1 to 24-3 when the "H" pulses have converted to "L". At the same time, mark bits are added to the input terminals 25-16 and 25-17 of the shift register 24-3 and the input terminals 25-10 to 25-15 of the shift register 24-2.

Depending on the data signals at the input terminals 26-1 to 26-8, the parity-bit addition circuit 26 judges the number of bits at logic "1" in the data signals. The signal at the output terminal 26-9 becomes logic "1" when the number is even and logic "0" when the number is odd. Thus, a parity bit is added next to the least significant bit of the data signal.

Ultimately, the output terminal 29t of the shift register 24-3 sends out a data signal 01101001 added with a mark bit M and a parity bit P, as shown at (23) of FIG. 5. Here, the parity bit is at logic "1" because four bits of the data signal are at logic "1".

In FIG. 5, (4) to (10) show the logics of signals at the input terminals 25-17 and 25-16 to 25-10, (11) shows the logics of a signal at the input terminal 25-9, (12) to (19) show the logics of signals at the input terminals 25-8 to 25-1, and (20) shows the logics of a signal at the input terminal 25-0.

Figure 6:
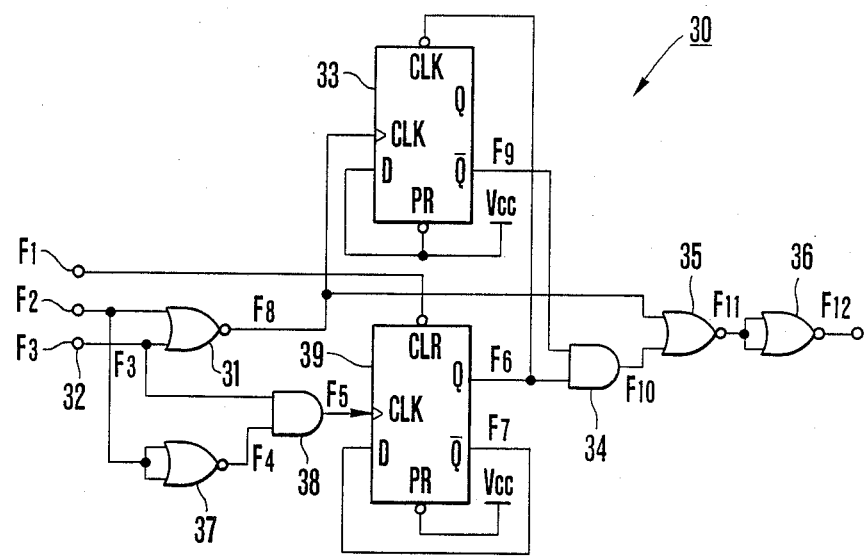
FIG. 6 is a circuit diagram showing the structure of a NRZ-CMI encoder of the preferred embodiment.

The output terminal 29t of the serializing circuit 23 shown in FIG. 4 is connected to the input terminal 32 of a NOR circuit 31 in a NRZ-CMI encoding circuit 30 shown in FIG. 6. The output terminal of the NOR circuit 31 is connected to the input terminal of a flip-flop 33. While the inverting output terminal Q of the flip-flop is connected to one of the input terminals of an AND circuit 34, the output terminal of the AND circuit 34 is connected to one of the input terminals of a NOR circuit 35. The output terminal of the NOR circuit is connected to the input terminal of a NOR circuit 36.

The output terminal of the NOR circuit is connected to the other input terminal of the NOR circuit 35, the other input terminal of the NOR circuit 31 to the input terminal of a NOR circuit 37, the output terminal of the NOR circuit to one of the input terminals of an AND circuit 38, and the other input terminal of the AND circuit 38 to the input terminal 32. While the output terminal of the AND circuit 38 is connected to the input terminal of a flip-flop 39, the output terminal Q of the flip-flop 39 is connected to the other input terminal of the AND circuit 34 and the reset terminal CLR of the flip-flop 33.

The terminal D and inverting output terminal $\overline{Q}$ of the flop-flop 39 are connected to each other. A clock signal of 1 MHz is supplied to the other input terminal of the NOR circuit 31 and the NOR circuit 37.

The NRZ-CMI encoder just described converts data signals of the NRZ sign obtained at the output terminal 29t of the serializing circuit 23 into those of the CMI sign.

Here, the CMI sign is defined to represent the logic "0" of the NRZ sign as a block signal "H, L" in which the first half of one bit is "H" and the second half is "L" and the logic "1" of the NRZ sign as a block signal "H, H" or "L, L" in which the first and second halves of one bit are both "H" or "L" inverted at the same level as that of the preceding logic "1". Synchronization clock signals mapped to the CMI sign can be generated quickly with high accuracy.

Figure 7:
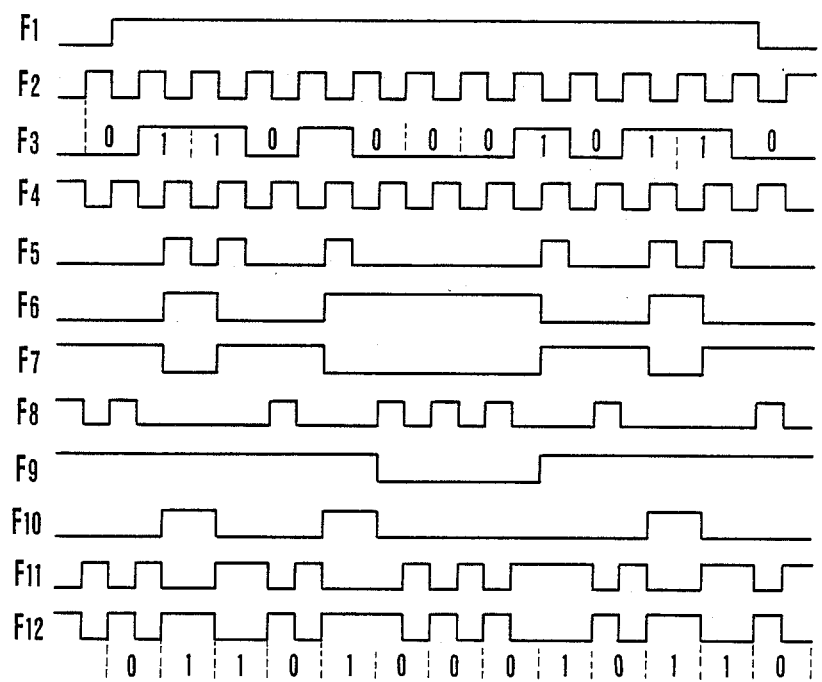
FIG. 7 signal waveforms at different parts of FIG. 6.

Because a clock signal F2 and a data signal F3 with the NRZ sign shown in FIG. 7 are fed into the NOR circuit, a signal with the CMI sign corresponding to logic "0" of the data signal with the NRZ sign, as shown at F8, appears at the output terminal thereof.

A signal F5 at logic "1" is fed into the flip-flop 39 in the second half of the logic "1" of the NRZ-signed data signal F3. Then, a succession of logics "1" in the NRZ-signed data signal F3 is detected, and a CMI-signed inverted signal F11 derived from an output signal F10 of the AND circuit 34 and an output signal F8 of the NOR circuit 35 appears at the output terminal of the NOR circuit 35. With this signal inverted by the NOR circuit 36, a CMI-signed data signal as shown at F12 of FIG. 7 appears at the output terminal of the NRZ-CMI encoding circuit 30.

Although the NRZ sign is converted into the CMI sign in the preferred embodiment, it is also possible to convert into the bi-phase sign, DMI sign and so on and also to deliver the signal with the NRZ sign unconverted.

Optical Pulse Signal Generator

Figure 8:
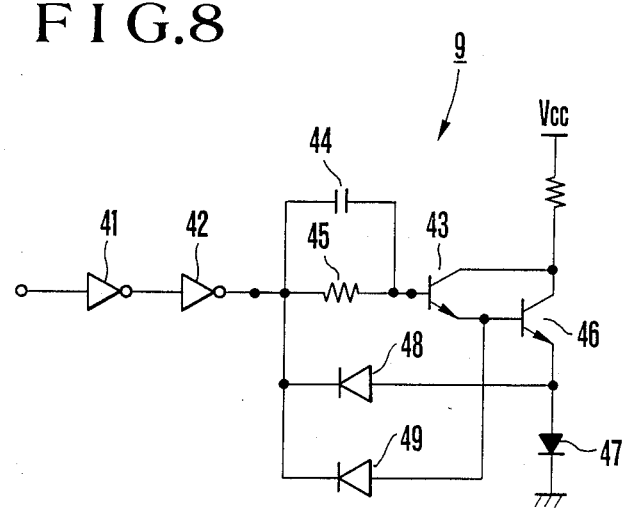
FIG. 8 is a circuit diagram showing an optical pulse generator of the preferred embodiment.

The CMI-signed data signals thus obtained are fed into the optical pulse signal generator 9 at the local station 5 through a transmission line 40. In the optical pulse signal generator 9, inverting circuits 41 and 42 are connected in series, a capacitor 44 and a resistor 45 are connected in parallel between the output terminal of the inverting circuit 42 and the base of a transistor 43, the collector of the transistor 43 is connected to the collector of a transistor 46, and the emitter of the transistor 43 is connected to the base of the transistor 46, as shown in FIG. 8. A voltage Vcc is applied to the collector of the transistor 46. The emitter of the transistor 46 is connected to the anode of a light-emitting diode 47 and the cathode of the light-emitting diode 47 is grounded.

While the anode of a diode 48 is connected to the emitter of the transistor 46, the cathode of the diode 48 is connected to the output terminal of the inverting circuit 42. A diode 49 has the anode connected to the base of the transistor 46 and the cathode connected to the output terminal of the inverting circuit 42.

When a CMI-signed data signal is fed into the input terminal of the inverting circuit 41 of the optical pulse signal generator 9 just described, the transistor 43 becomes conductive when the signal is at logic "1", whereupon the transistor 46 also conducts as voltage is applied to the base thereof. As the transistor 46 conducts, voltage is applied to the light-emitting diode 47 that then lights up to emit infrared light corresponding to the level of the CMI-signed data signal "H". Because the transistors 43 and 46 forms a Darlington amplifier, the hfe (current amplification factor) of the circuit becomes so high that the output variation at the output terminal of the inverting circuit 42 can be suppressed.

The capacitor 44 makes the transistor 43 to quickly respond to the CMI-signed data signals. The diode 48 prevents response delay due to the capacity between the terminals of the light-emitting diode 47, thereby materially shortening the fall time. The diode 49 prevents response delay due to the capacity between the base and emitter of the transistor 46.

Figure 9A:
FIG. 9 (A) and (B) and FIG. 10 (A) through (D) show signal waveforms at different parts of FIG. 8.
Figure 9B:
Figure 10A:
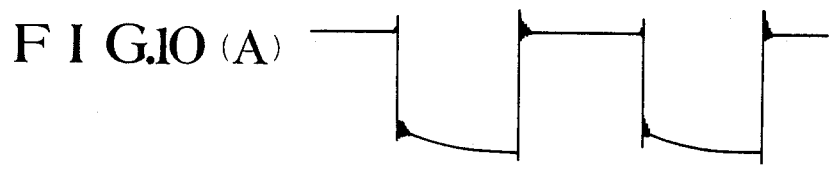
Figure 10B:
Figure 10C:
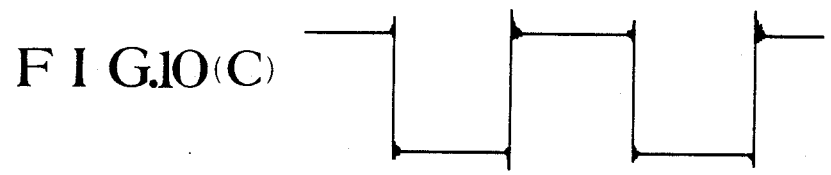
Figure 10D:
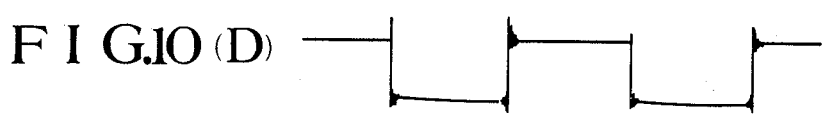

The waveforms of voltage between the terminals of the light-emitting diode the inventors determined are shown at (A) and (B) of FIG. 9. (A) shows one without the diode 49. (B) shows one with the diode 49. Obviously, the diode 49 made the waveform of voltage between the terminals steeper. FIG. 10 shows the waveforms of the signals at the output terminal of the inverting circuit 42 and the base of the transistor 46 without the diode 49 at (A) and (B). The waveforms shown at (C) and (D), which correspond to those at (A) and (B) respectively, evidence the effect of inserting the diode 49.

Space Transmitting Path Setting Means

The space transmitting path setting means 10 sets the path along which infrared-light optical pulse signals output from the optical pulse signal generator 9 are to be transmitted.

Figure 11:
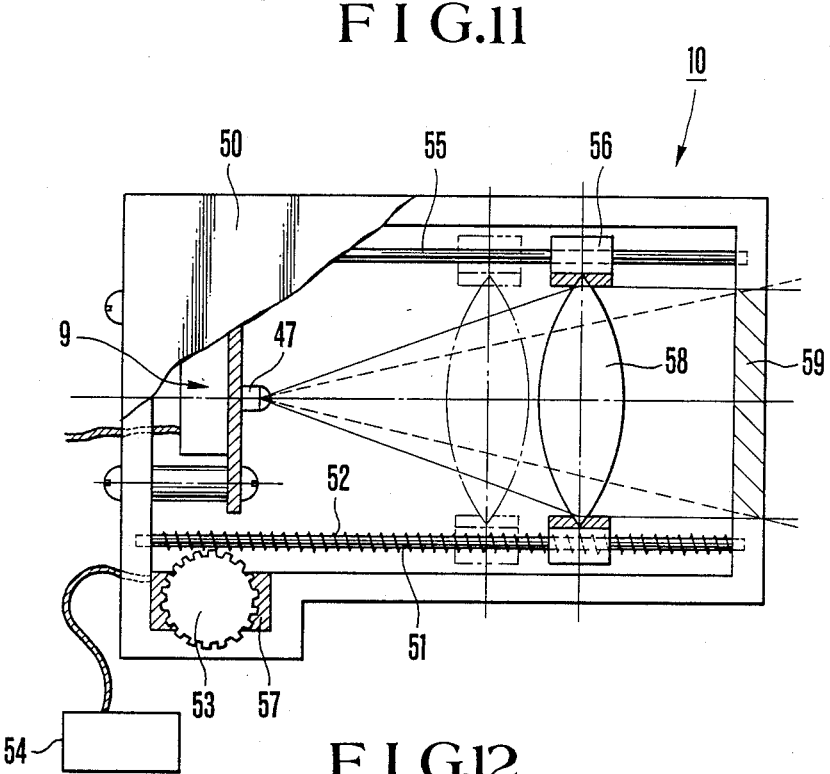
FIG. 11 a partially exploded view showing the structure of a space transmitting path setting means of the preferred embodiment.

As shown in FIG. 11, the space transmitting path setting means 10 is contained in a rectangular parallelepiped case 50 of shading material. The optical pulse signal generator 9 is positioned close to one end plate of the case 50. A rotatable drive shaft 51 cut with a thread 52 extends longitudinally along the bottom of the case 50. A stepping motor 57 is fastened on the bottom close to one of the end plates of the case 50. The stepping motor 57 connected to a drive circuit 54 has a gear 53 that is engaged with the thread 52. An infrared filter 59 through which infrared pulse signals are emitted is provided on the other end plate of the case 50.

In the case 50, a guide 55 is positioned opposite the drive shaft 51, with an annular holder 56 attached to the guide 55 and drive shaft 51. A lens 58 is fastened to the holder 56. The holder 56 is loosely fitted over the guide 55 and engaged with the thread on the drive shaft 51.

The stepping motor 54 driven by the drive circuit 54 rotates the drive shaft 51, whereby the holder 56 moves along the drive shaft 51. The motion of the holder 56 causes the lens 58 to move back and forth with respect to the light-emitting diode 47, thereby setting the space path along which optical pulse signals are to be transmitted.

Solid line in FIG. 11 shows a transmission path set parallel to optical pulse signals. This path permits effectively transmitting optical pulse signals to a distant point, with energy density per unit space increased. When the lens 58 is moved to a position indicated by dotted line in FIG. 11, optical pulse signals can be sent out to a wider range as shown dotted. But the effective transmittable distance of optical pulse signals shortens as a result of reduction in energy density per unit space.

Space Receiving Path Setting Means

While the light transmitting path is set by the space transmitting path setting means 10, a light receiving path to receive the emitted optical pulse signals is set by the space receiving path setting means 11.

Figure 12:
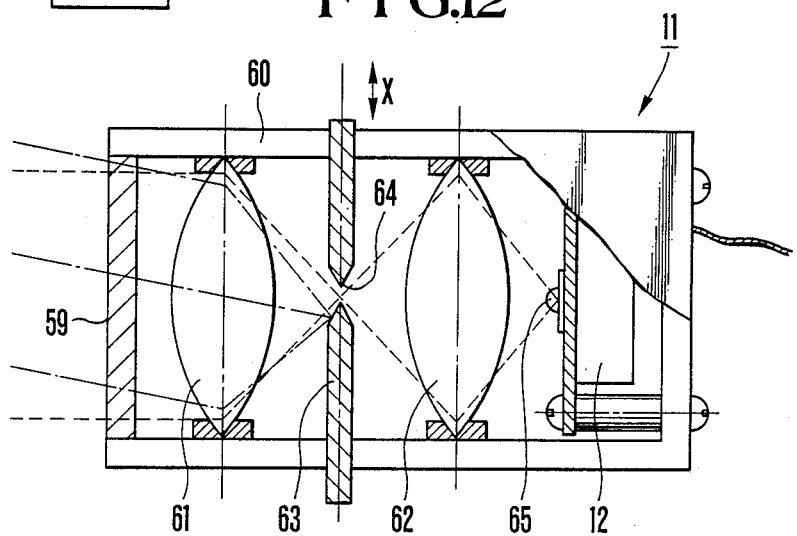
FIG. 12 is a partially exploded view showing the structure of a space receiving path setting means of the preferred embodiment.

As shown in FIG. 12, the space receiving path setting means 11 is contained in a rectangular parallelepiped case 60 of shading material. An infrared filter 59 is provided at one end of the case 60. Lenses 61 and 62 are disposed in the case 60, with the optical axis thereof aligned to each other. A slit sheet 63 of shading material is interposed between the lenses 61 and 62, with a slit 64 cut in the sheet 63 positioned where the lens 61 focuses. The position of the slit sheet 63 is adjustable at right angles to the optical axis in the direction indicated by arrow X in FIG. 12.

The light receiving device 12 is contained at the other end of the case 60. A photo diode 65 on the light receiving device 12 is positioned where the lens 62 focuses. Even if an external disturbing light, such as sunlight, reaches the space receiving path setting means 11 as shown by dot-dash line in FIG. 12, the disturbing light does not pass through the slit 64, whereby a light receiving path is set without getting disturbed thereby. The infrared filters 59 in the space transmitting path setting means 10 and space receiving path setting means 11 cut off lights whose wave length is shorter than 0.7 micrometers. Consequently, only high-quality infrared optical pulse signals without containing noise light are admitted into the photo diode 65 of the light receiving device 12.

When the optical axis of an optical pulse signal inclines slightly, the slit sheet 63 is moved in the direction of arrow X in FIG. 12 to cause the optical pulse signal to be admitted while keeping the maximum intensity thereof.

Light Receiving Device

Figure 13:
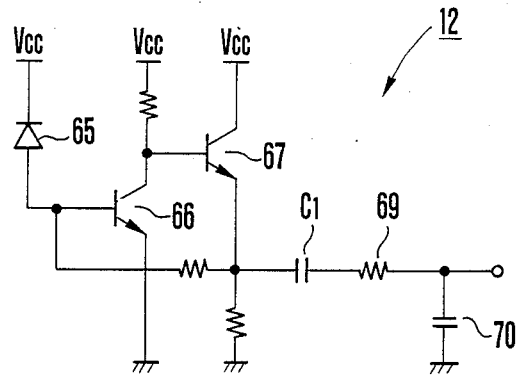
FIG. 13 is a circuit diagram showing the structure of a light receiving device of the preferred embodiment.

The structure of the light receiving device 12 is as shown in FIG. 13. While voltage Vcc is applied to the cathode of the photo diode 65, the anode of the photo diode 65 is connected to the base of a transistor 66, with the emitter of the transistor 66 grounded and the collector of the transistor 66 connected to the base of a transistor 67. Voltage Vcc is applied to the collector of the transistor 66 through resistor. While voltage Vcc is applied to the collector of the transistor 67, the emitter of the transistor 67 is grounded through a resistor.

The base of the transistor 66 is connected through a resistor to the emitter of the transistor 67. The emitter of the transistor 67 is connected through a capacitor to one end of a resistor 69. A capacitor 70 is interposed between the other end of the resistor 69 and ground. The connecting point of the resistor 69 and capacitor 70 serves as an output terminal. The resistor 69 and capacitor 70 form, in combination, a low-pass filter.

The light receiving device 12 converts the admitted CMI-signed optical pulse signals into CMI-signed electrical pulse signals which are thence fed into the signal decoder 13.

Signal Decoder

Figure 14:
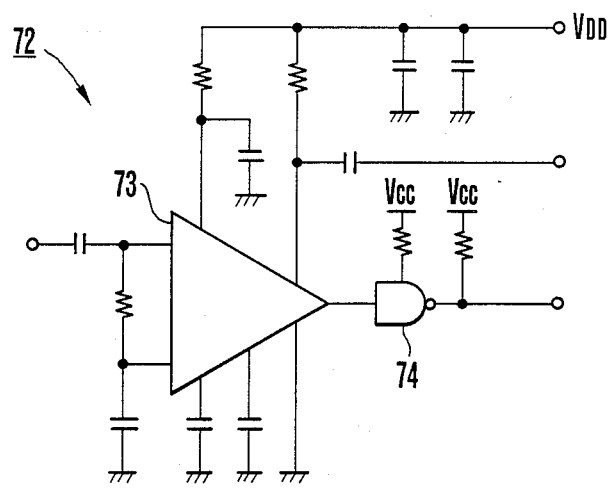
FIG. 14 is a circuit diagram showing the structure of an amplifier circuit of the preferred embodiment.
Figure 15:
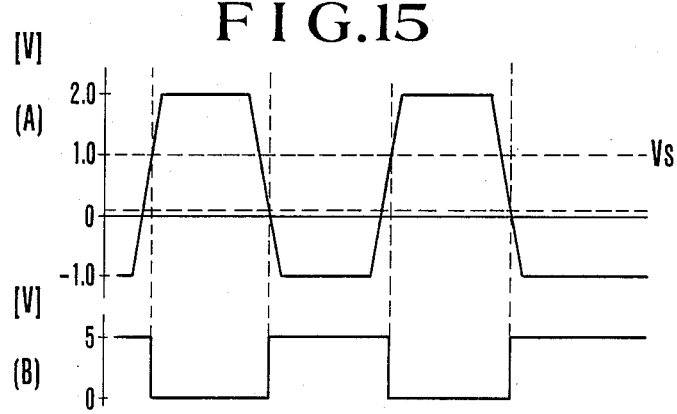
FIG. 15 shows waveforms of signals amplified by the circuit of FIG. 14.

An amplifier circuit 72 shown in FIG. 14 is provided in the initial stage of the signal decoder 13. After the CMI-signed pulse signals are amplified by an amplifier 73, a threshold setting circuit 74 sets a given threshold. As shown in FIG. 15, the threshold setting circuit 74 provides output (B) for input (A) not lower than the given threshold Vs.

As the CMI-signed pulse signals thus obtained from the amplifier circuit 72 are fed into a timing clock extraction circuit 75 where the phase difference between the CMI-signed pulse signal and the synchronizing clock is detected to achieve synchronization of the two signals in a short time.

Figure 16:
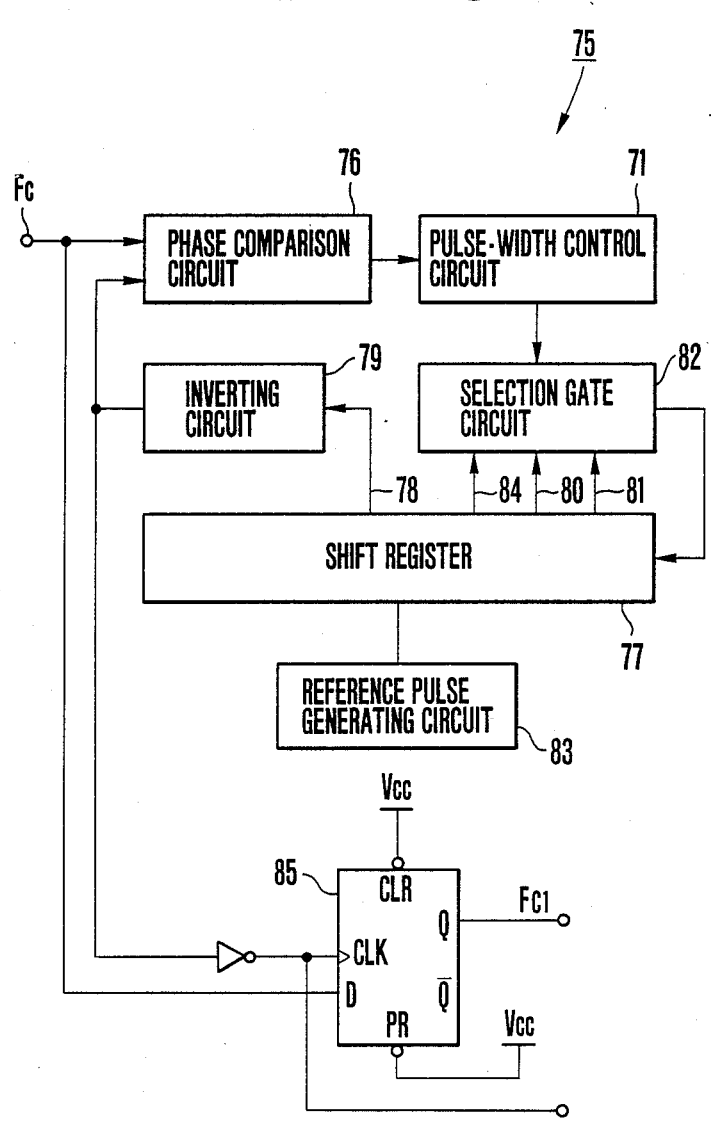
FIG. 16 is a block diagram showing the structure of a timing clock extraction circuit of the preferred embodiment.

The CMI-signed pulse signals $F_C$ from the amplifier circuit 72 are admitted into one of the input terminals of a phase comparison circuit 76 as shown in FIG. 16. A clock signal of 2 MHz from a reference clock terminal 78 of a shift register 77 is inverted in an inverting circuit 79 and fed into the other input terminal of the phase comparison circuit 76.

The phase comparison circuit 76 detects the phase difference between the clock signal from the reference clock terminal 78 and the CMI-signed pulse signal, whereby a choice is made in a selective gate circuit 82 through a pulse width control circuit 71 connected to the phase comparison circuit 76.

The selective gate circuit 82 usually resets the shift register 77 with an output from a 1/16 dividing terminal 80 that divides a pulse of 32 MHZ from a reference pulse generating circuit 83, thereby causing the reference clock terminal 78 to output a pulse of 2 MHz.

When the phase comparison circuit 76 detects that the clock signal from the reference clock terminal 78 is fast, the selective gate circuit 82 tests the shift register 77 with an output from a 1/17 dividing terminal 81 thereof. Then, therefore, the reference clock terminal 78 outputs a clock signal of 1.88 MHz that is one pulse longer than the pulse signal from the reference pulse generating circuit 83. When the phase comparison circuit 76 detects that the clock signal from the reference clock terminal 78 is slow, the selective gate circuit 82 resets the shift register 77 with an output from a 1/15 dividing terminal 84 thereof. Then, therefore, the reference clock terminal 78 outputs a clock signal of 2.13 MHz that is one pulse shorter than the pulse signal from the reference pulse generating circuit 83.

Soon after the receiving of data begins, therefore, the clock signal is instantaneously synchronized to the CMI-signed pulse signal $F_C$. Synchronization is continually monitored so that completely synchronized signal processing is achieved.

The clock signal thus synchronized is fed into the input terminal CLK of a flip-flop 85, while the CMI-signed pulse signal $F_C$ is fed into the terminal D. The flip-flop reproduces the CMI-signed pulse signal by means of the synchronized clock signal.

With the CMI-signed pulse signal $F_{C1}$ obtained at the output terminal of the flip-flop 85 is fed into a CMI-NRZ decoding circuit 86 where the CMI-signed pulse signal is converted into a NRZ-signed pulse signal. At the same T time, the CMI-signed pulse signal $F_{C1}$ is also fed into a sign error detecting circuit 87 to determine whether or not the CMI-signed pulse signal $F_{C1}$ contains a sign error.

Figure 17:
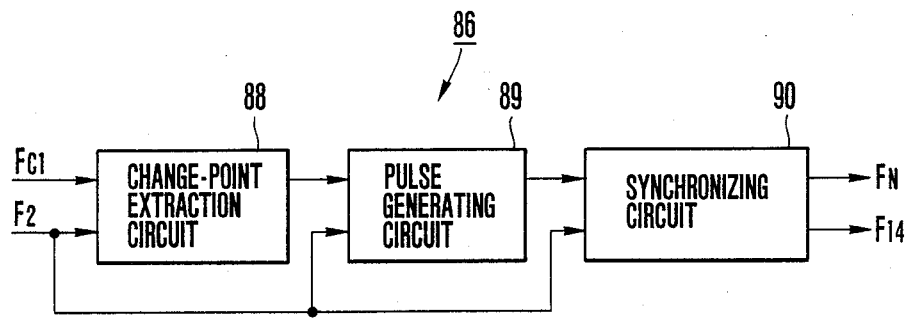
FIG. 17 is a block diagram showing the structure of a CMI-NRZ decoder of the preferred embodiment.

The structure of the CMI-NRZ decoding circuit 86 is as shown in FIG. 17. The CMI-signed pulse signal $F_{C1}$ and a clock signal F2 of 2 MHz are given to a change-point extraction circuit 88 that extracts the change point at which "H" in the first half of one bit of the CMI-signed pulse signal at logic 0 changes to "L" in the second half thereof. For a signal whose change point is extracted by the change-point extraction circuit 88, a pulse generating circuit 89 creates a signal at logic "0" corresponding to the NRZ sign. For a signal whose change point is not extracted by the change-point extraction circuit 88, the pulse generating circuit 89 creates a signal at logic "1" correponding to the NRZ sign.

Synchronizing the pulse signal whose sign has thus been converted from CMI to NRZ to a clock signal of 2 MHz, a synchronizing circuit 90 produces a NRZ-signed pulse signal $F_N$. At the same time, the synchronizing circuit 90 outputs a clock signal F14 of 1 MHz that is used in a circuit to be described later.

Figure 18:
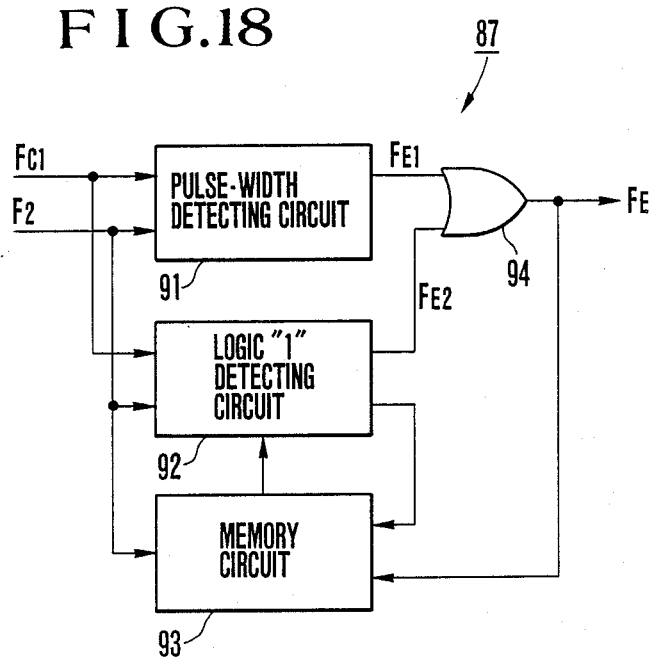
FIG. 18 is a block diagram showing the structure of a sign error detecting circuit of the preferred embodiment.

The sign error detecting circuit 87 determines the pulse width of the transmitted CMI-signed pulse signal $F_{C1}$ at logic "1" and checks for error in the inversion rule of logic "1". The structure of the sign error detecting circuit 87 is shown in FIG. 18. The CMI-signed pulse signal $F_{C1}$ is fed into a pulse-width detecting circuit 91 and a logic "1" detecting circuit 92 which are synchronously driven by a clock signal F2 of 2 MHz. One of the outputs from the logic "1" detecting circuit 92 enters a memory circuit 93 synchronously driven by a clock signal F2 of 2 MHz where the level of logic "1" is stored. Then the data stored in the memory circuit 93 is fed into the logic "1" detecting circuit 92 that checks if the logic "1" of the CMI-signed pulse signal $F_{C1}$ is normally inverted.

The pulse width detecting circuit 91 outputs an error signal $F_{E1}$ when the high or low level of the CMI-signed pulse signal $F_{C1}$ exceeds the width of 2 pulses at logic "1". The logic "1" detecting circuit 92 outputs an error signal $F_{E2}$ when the level of the logic "1" of the CMI-signed pulse signal $F_{C1}$ is not properly inverted.

The error signals $F_{E1}$ and $F_{E2}$ are fed into an OR circuit 94 that outputs an error signal FE when the error signal $F_{E1}$ or $F_{E2}$ is present. The error signal FE resets the memory circuit 93.

Figure 19:
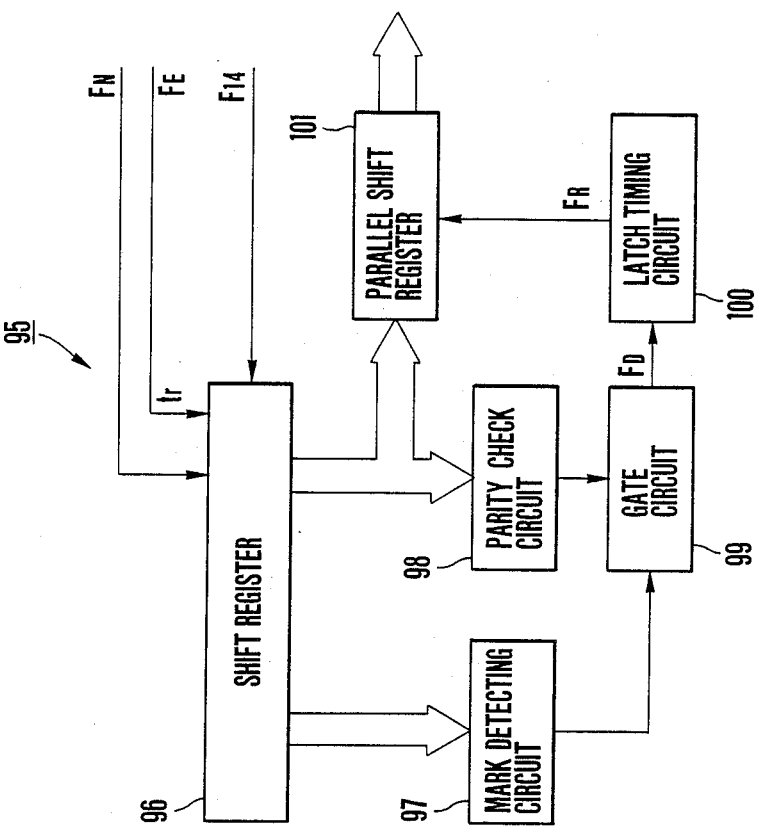
FIG. 19 is a block diagram showing the structure of a serial-parallel converter of the preferred embodiment.

The output terminal of the CMI-NRZ decoding circuit 86 and the output terminal of the sign error detecting circuit 87 are connected to a shift register 96 in a serial-parallel converter 95 shown in FIG. 19.

As the error signal $F_E$ output from the sign error detecting circuit 87 is fed into the reset terminal tr to reset the shift register, the NRZ-signed pulse signal converted by the CMI-NRZ decoder 86 is not admitted in L the shift register 96. When the error signal $F_E$ is not present, the NRZ-signed pulse signal $F_N$ is fed into the shift register 96, whereby a mark sensing circuit 97 detects the mark M added to the 8 bits of high order of the NRZ-signed pulse signal and a parity checking circuit 98 checks the parity P added to the low-order bits of the NRZ-signed pulse signal. To the mark sensing circuit 97 and parity checking circuit 98 is connected a gate circuit 99 that feeds a drive signal $F_D$ into a latch timing circuit 100 when the mark and parity have proved normal. On receiving the drive signal $F_D$, the latch timing circuit 100 outputs a latch signal $F_R$ that feeds the NRZ-signed pulse signal from the shift register 96 into a parallel shift register 101. The shift register 96 is synchronously driven by the clock signal F14 of 1 MHz generated by the CMI-NRZ decoder 86.

Data Display

Figure 20:
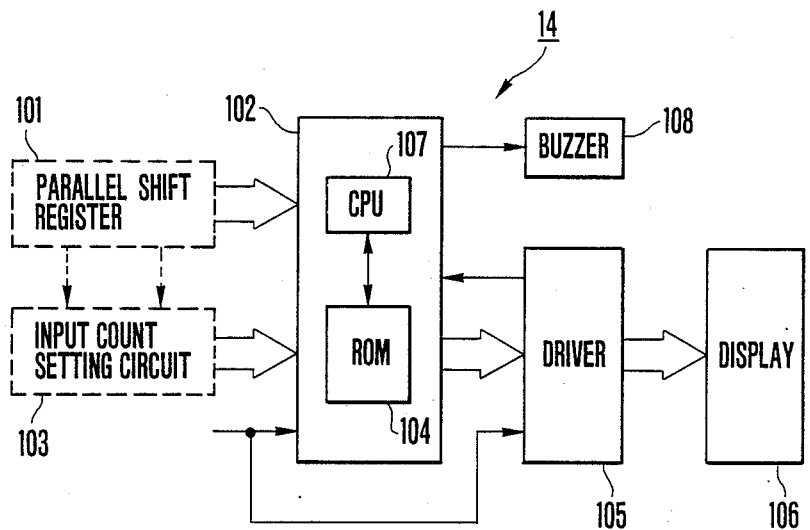
FIG. 20 is a block diagram showing the structure of a data display of the preferred embodiment.

The NRZ-signed data paralleled by the serial-parallel converter 95 is fed into the data display 14 shown in FIG. 20 to exhibit the transmitted date.

The parallel shift register 101 of the serial-parallel converter 95 feeds the NRZ-signed data into an arithmetic circuit 102 of the data display 14. The input is done after an input count setting circuit 103 has confirmed that the data input a given number of times are of the same sign.

When the NRZ-signed data is fed into the arithmetic circuit 102, a central processing unit (CPU) 107 reads out a dot pattern from a read-only memory (ROM) 104 in accordance with the input sign. A driver 105 displays data on a display 106 based on the dot pattern. The ROM 104 of the preferred embodiment contains numeric, hiragana (Japanese cursive kana character), kanji (Chinese character) and alphabetic patterns that can be used for showing emergency information as shown at (A), traffic information as shown at (B) and service information as shown at (C) of FIG. 21 on the display 106.

For example, a vehicle running at a speed of 100 km/hr. can receive information of about 200 characters at a time from a local station positioned along the road.

The data display 14 has a mechanism to actuate a buzzer 108 the moment the received data is shown on the display 106 so that the vehicle driver should not overlook the information. Especially when a speed limit information is received from a local station in a dangerous traffic zone, the CPU 107 compares the running speed of the vehicle with the speed limit. When the running speed exceeds the speed limit, the buzzer 108 continues to sound an alarm until the running speed is reduced to below the speed limit.

The preferred embodiment of this invention is capable of transmitting much information at high speed using signed optical pulse signals directly corresponding to the on-off of light intensity as data signals, without employing high-frequency carrier waves. The space transmitting and receiving paths setting means set paths along which high-quality signed optical pulse signals can be transmitted without getting disturbed by external light.

Therefore, a vehicle equipped with a mobile station can travel safely and comfortably as it is capable of quickly receiving various kinds of emergency, traffic and service information at given points of the travel route.

In the preferred embodiment just described, the transmitting station is fixed and the receiving station is mobile. But the preferred embodiment should not be considered as limiting the scope of this invention. For example, the transmitting station may be located on a patrol car to send out information collected while the car makes a round trip in a given area.

In the preferred embodiment, all information is supplied from the base station to the local station. But the local station may be equipped with a read-only memory (ROM) to store ordinary information that is read out by the local station for transmission. Then, only emergency information will be transmitted from the base station through the local station.

External Light Shading Means

In FIG. 22 through FIG. 26, the embodiment which are provided with the means for shading the external light from the receiving surface of the receiving device. The embodiment of FIG. 22 is provided with a fixed shading plate 109 which shades sun's rays 110 from the receiving surface of the receiving device 12, thereby transmitting the coded optical pulse signals to the receiving surface of the receiving device 12 preventing it from being exposed to the direct rays of the sun.

Figure 24:
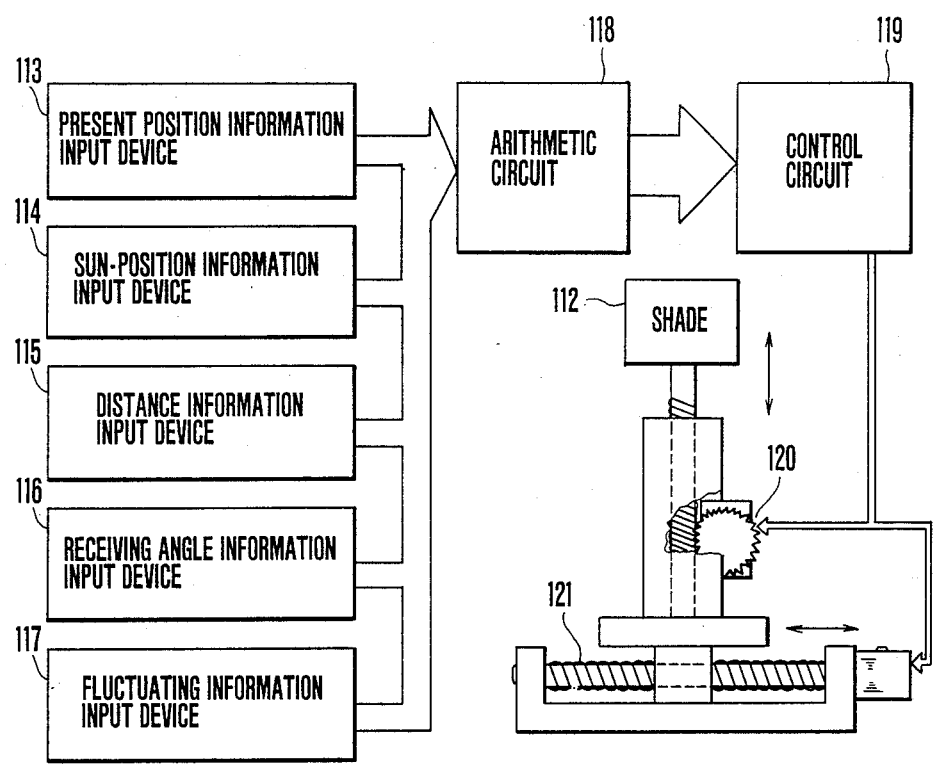
FIG. 24 is a block diagram showing the control system in the external light shade of FIG. 23.

In the embodiment of FIG. 23, the shading plate 112 is so arranged as to be movable. When the sun's rays come along the direction 110-2, the shading plate 112 takes a position shown by solid lines in FIG. 23. When the sun's rays come along the direction 110-1, the shading plate 112 moves to the position shown by dotted lines. The shading plate 112 is moved by a driving device as shown in FIG. 24. The driving device have a present position information input device 113 to which the information of the latitude, the longitude and the height above the sea level of the present position are inputted, a sun position information input device 114 to which the information of the elevation angle and the compass direction angle of the sun according to the season, the day and the time are inputted, a distance information input device 115 to which the information of the distance between the optical pulse signal generating device 9 and receiving device 12 are inputted, a receiving angle information input device 116 to which the information of the receiving angle is inputted, and a fluctuating information input device 117 to which the information of the fluctuation of the receiving station is inputted. The output of these input devices are calculated by an arithmetic circuit 118 and control signals are generated by a control circuit 119 according to the output of the arithmetic circuit 118. By the movement of a vertical driving shaft 120 and horizontal driving shaft 121 which are driven by the control signals, the shading plate is moved to a specific position according to the present position, the season and the day and time.

Figure 25:
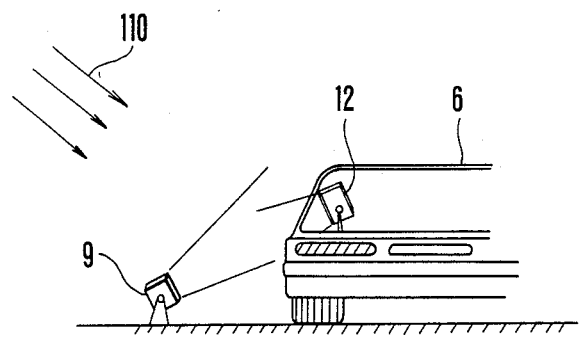
FIG. 25 and FIG. 26 show respectively a pictorial view of the other embodiments of external light shading means.

FIG. 25 shows an embodiment in which the optical signal generating device 9 and the receiving device 12 are disposed in a specific relative position so that the receiving surface of the receiving device 12 can avoid the direct sun's rays 110.

Figure 26:
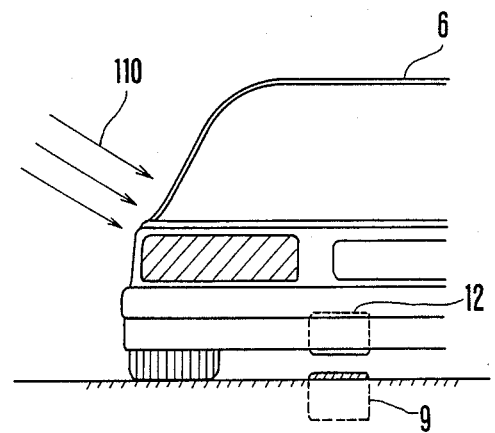

FIG. 26 shows an embodiment in which the optical pulse generating device 9 and the receiving device 12 are disposed in a relation so that the direct sun's rays 110 are shaded by the body of a vehicle. By these arrangement too, the coded optical pulse signals are transmitted without being disturbed by the sun's rays.

Incidentally, it is of course that the "external light" in this invention means not only the sun's rays but also various external lights coming from various illuminations or lightnings on streets or buildings.

It should be understood that, although the preferred embodiment of the present invention has been described herein in considerable detail, certain modifications, changes, and adaptations may be made by those skilled in the art and that it is hereby intended to cover all modifications, changes and adaptations thereof falling within the scope of the appended claims.

What is claimed is:

1. A space transmission optical communication system for a road traffic system between a transmitting station to send out coded optical pulse signals carrying traffic information and a receiving station disposed on a vehicle to receive the coded optical pulse signals sent through space from the transmitting station and to display said information:

said transmitting station comprising a base station having an input device to feed in data to be transmitted and a signal encoder to convert the data fed into the input device into corresponding coded signals; and a plurality of local stations connected to said base station and at given intervals along a road, each local station having an optical pulse signal generator to deliver said coded optical pulse signals corresponding to the coded signals encoded by the signal encoder, and a space transmitting path setter to set a path having an adjustable width along which the coded optical pulse signals from the optical pulse signal generator are transmitted through space, said space transmitting path setter having a lens for passing said optical pulse signals therethrough, said lens being disposed so that the distance between the lens and the optical pulse signal generator can be varied by means of a lens driving mechanism comprising a pulse motor and a gear system, to vary the width of the path for sending out the optical pulse signals through the lens, said receiving station disposed on a vehicle comprising a receiving space path setter to set a path along which the coded optical pulse signals transmitted along the space transmitting path are received, a receiving device to receive the coded optical pulse signals, a signal decoder to decode the output from the receiving device into the coded signals, and a data display to display the data in visible form based on the output from the signal decoder, and said receiving space path setter comprising at least two lenses disposed so that the optical axes thereof are aligned with each other and a sheet of shading material having a slit interposed between said lens so as to be slidable in a direction transverse to the optical axis, to pass only the optical pulse signals through said slit and prevent disturbing lights from reaching the receiving device.

2. A space transmission optical communication system of claim 1, in which the receiving station is a mobile station location on a vehicle.

3. A space transmission optical communication system of claim 1, in which said receiving station is further provided with an external light shading means for shading external lights from a receiving surface of said receiving device, said external light shading means comprising a shading plate and a driving means which can move said shading plate according to information relating to sun positions to such positions that said receiving path setter at a signal receiving position is shaded from sun beam.

4. A space transmission optical communication system of claim 3, in which the receiving station is a mobile station located on a vehicle.

* * * * *